United States Patent [19]
Inoue et al.

[11] Patent Number: 5,819,843
[45] Date of Patent: Oct. 13, 1998

[54] COGENERATION SYSTEM

[75] Inventors: Yoshinori Inoue, Takarazuka; Nozomu Kusumoto, Neyagawa; Yuji Yoshitake, Nishinomiya; Tokuyuki Akashi, Ashiya, all of Japan

[73] Assignee: Takenaka Corporation, Osaka, Japan

[21] Appl. No.: 715,968

[22] Filed: Sep. 19, 1996

Related U.S. Application Data

[62] Division of Ser. No. 252,785, Jun. 2, 1994, Pat. No. 5,607,013.

[30] Foreign Application Priority Data

Jan. 27, 1994 [JP] Japan .................................. 6-026046
Feb. 7, 1994 [JP] Japan .................................. 6-035504

[51] Int. Cl.⁶ .............................. F25B 29/00; F25D 7/02; F24F 5/00
[52] U.S. Cl. ..................... 165/219; 165/272; 165/299; 165/48.1; 165/50; 165/104.21; 237/12.1
[58] Field of Search ................ 165/207, 219, 165/272, 299, 50, 104.21, 47, 48.1; 62/238.3, 323.2, 434, 59, 238.6, 238.7, 435

[56] References Cited

U.S. PATENT DOCUMENTS

| | | |
|---|---|---|
| 3,913,331 | 10/1975 | Conwell . |
| 4,065,055 | 12/1977 | De Cosimo . |
| 4,309,877 | 1/1982 | Tawsel .................................. 62/323.2 |
| 4,686,378 | 8/1987 | Sisk . |
| 4,715,192 | 12/1987 | Katz ........................................ 237/12.1 |
| 4,796,439 | 1/1989 | Yamada et al. ........................ 62/238.6 |
| 4,843,832 | 7/1989 | Yamada et al. ............................ 165/26 |
| 4,896,830 | 1/1990 | Takamatsu ............................. 237/12.1 |
| 4,951,871 | 8/1990 | Hata et al. .............................. 237/12.1 |
| 5,044,172 | 9/1991 | Inoue et al. .............................. 165/335 |
| 5,607,013 | 3/1997 | Inoue et al. .............................. 165/219 |

FOREIGN PATENT DOCUMENTS

| | | |
|---|---|---|
| 55-164459 | 11/1980 | Japan . |
| 0031818 | 3/1981 | Japan .................................. 62/323.2 |
| 0031741 | 2/1982 | Japan .................................. 62/238.3 |
| 0019157 | 1/1989 | Japan .................................. 237/12.1 |
| 64-33445 | 2/1989 | Japan . |
| 1-107031 | 4/1989 | Japan . |
| 1-74834 | 7/1989 | Japan ..................................... 165/47 |

(List continued on next page.)

OTHER PUBLICATIONS

Japanese Patent Abstract No. 2–23211, Jan. 25, 1990.

"Jahrbuch der Warmeruckgewinnung", 5, Ausgabe 1985/1986, Warmeruckgewinnung and Warmepumpenandung in Hochbau, Gewerbe und Industrie, zusammengestellt und bearbeitet, von Ing.(grad.) A. Dickopp, Ing. (grad.) H. Eickenhorst and Dr.–Ing. J. Paul, Vulkan–Verlag, Essen, (no date).

*Primary Examiner*—John K. Ford
*Attorney, Agent, or Firm*—Nikaido, Marmelstein, Murray & Oram LLP

[57] ABSTRACT

A cogeneration system includes a gas engine generator acting as private power generating equipment for generating power to be supplied to private electricity consuming equipment, and a source-side heat exchanger connected to the gas engine generator through an exhaust heat recovery piping to act as a heat source. A heat medium is heated and evaporated through a heat exchange in the source-side heat exchanger. The resulting vapor is allowed to flow upward to be supplied to room heating heat exchangers. The vapor is liquefied through a heat exchange in the room heating heat exchangers. The resulting liquid is allowed to flow downward back to the source-side heat exchanger. This natural circulation of the heat medium is used for the heating purpose. Surplus exhaust heat is released through a generator to control the heat medium supplied to the room heating heat exchangers. Thus, the private power generating equipment supplies power to the private electricity consuming equipment, while exhaust heat of the generating equipment is used to heat rooms. The entire system is constructed at low cost.

4 Claims, 5 Drawing Sheets

U.S. PATENT DOCUMENTS

| | | | |
|---|---|---|---|
| 2-154948 | 6/1990 | Japan . | |
| 3-122465 | 5/1991 | Japan | 62/238.3 |
| 3-129268 | 6/1991 | Japan | 62/238.3 |
| 3-160238 | 7/1991 | Japan . | |
| 3-160239 | 7/1991 | Japan . | |
| 3-160240 | 7/1991 | Japan . | |
| 0186165 | 8/1991 | Japan | 62/323.2 |
| 5-322459 | 12/1993 | Japan . | |

COGENERATION SYSTEM

This is a division of Ser. No. 252,785 filed Jun. 2, 1994, now U.S. Pat. No. 5,607,013, issued Mar. 4, 1997.

BACKGROUND OF THE INVENTION (1) Field of the Invention

The present invention relates to a cogeneration system having private power generating equipment for supplying power to private electricity consuming equipment, with exhaust heat of the private power generating equipment utilized for room heating and/or cooling purposes.

(2) Description of the Related Art

A conventional cogeneration system as noted above is disclosed in Japanese Patent Publication (Unexamined) No. 2-23211, for example.

In the conventional cogeneration system, exhaust gas of a two-shaft gas turbine is supplied to an exhaust heat boiler for generating hot steam. The hot steam is supplied to a condensing extraction turbine to drive a synchronous generator for generating power. Hot water is obtained from exhaust heat of the exhaust heat boiler, while cold water is obtained by supplying steam extracted from the condensing extraction turbine to an absorption refrigerator. The hot water and cold water are used for room heating and cooling purposes, respectively.

The conventional system usually employs pumps for supplying the hot water to heat exchangers for the room heating purpose, and for supplying the cold water to heat exchangers for the room cooling purpose. The pumps are driven by the power derived from the synchronous generator.

However, the above system requires numerous large capacity pumps to deliver hot water and cold water under pressure to numerous locations within a building, for example. This amounts to a disadvantage of increasing initial cost. Further, since a large amount of power is consumed in driving the pumps, the private generating equipment must have a large power output, which also increases the initial cost. On the other hand, where power is supplied from an external source, the system involves high running costs. Thus, the system tends to be expensive to install and run.

SUMMARY OF THE INVENTION

A primary object of the present invention is to provide a cogeneration system having private power generating equipment for supplying power to private electricity consuming equipment, with exhaust heat of the private power generating equipment utilized for a room heating purpose, which system as a whole is inexpensive to install and run.

Another object of the invention is to provide a cogeneration system, as noted above, which is fully capable of coping with heating load variations exceeding the exhaust heat of the private power generating equipment.

A further object of the invention is to provide a cogeneration system, as noted above, which effectively utilizes the exhaust heat of the private power generating equipment.

A still further object of the present invention is to provide a cogeneration system having private power generating equipment for supplying power to private electricity consuming equipment, with exhaust heat of the private power generating equipment utilized for a room cooling purpose, which system as a whole is inexpensive to install and run.

Yet another object of the invention is to provide a cogeneration system, as noted above, which is fully capable of coping with cooling load variations even if the private power generating equipment has a limited output.

A still further object of the invention is to provide a simple and inexpensive cogeneration system for utilizing the exhaust heat of the private power generating equipment for both room cooling and heating purposes.

A still further object of the invention is to provide a cogeneration system which is fully capable of coping with cooling load variations exceeding the exhaust heat of the private power generating equipment.

A still further object of the invention is to provide a cogeneration system, as noted above, which effectively utilizes the exhaust heat of the private power generating equipment.

Other objects of the invention will be apparent from the description of preferred embodiments to follow.

The above objects are fulfilled, according to the present invention, by a cogeneration system comprising private power generating equipment for generating power to be supplied to private electricity consuming equipment; a source-side heat exchanger connected to the private power generating equipment to act as a heat source; room heating heat exchangers arranged above the source-side heat exchanger to act as user equipment, the room heating heat exchangers being connected to the source-side heat exchanger through a natural circulation piping having, in natural circulation there-through, a heat medium subjected to gas-liquid phase changes; a radiator connected to the natural circulation piping; surplus heat detecting means for detecting presence of surplus heat and outputting a radiation signal; and radiation control means operable in response to the radiation signal to switch the radiator to a radiating state.

According to the cogeneration system of the present invention, the private power generating equipment supplies power to the private electricity consuming equipment, while exhaust heat of the generating equipment is supplied to the source-side heat exchanger to heat rooms through the heat medium allowed to flow in natural circulation between the source-side heat exchanger and room heating heat exchangers. When the exhaust heat from the private power generating equipment exceeds an amount required by the room heating heat exchangers, the radiation control means automatically switches the radiator to the radiating state to release the surplus heat. In this way, the heat medium is supplied in a controlled amount to the room heating heat exchangers while the private power generating equipment carries out a predetermined power generating operation.

Thus, the power generated by the private power generating equipment is supplied to the private electricity consuming equipment, with the exhaust heat of the private power generating equipment utilized to heat and evaporate the heat medium. The rooms are heated by the heat medium flowing in natural circulation between the source-side heat exchanger and room heating heat exchangers. Consequently, this system dispenses with the heat transmitting drive such as pumps for supplying the heat medium to the room heating heat exchangers, and simplifies maintenance. The private power generating equipment supplies power to the private electricity consuming equipment, while the exhaust heat of the generating equipment is used to heat the rooms. The entire system is constructed and run at low cost.

When the exhaust heat from the private power generating equipment exceeds an amount required by the room heating heat exchangers, the surplus heat is automatically released from the radiator. This control mode is simpler than adjusting delivery from pumps, and contributes toward low cost of the system.

To fulfill the forgoing objects of the present invention, the source-side heat exchanger may be connected to the private power generating equipment through an exhaust heat recovery piping, and the above cogeneration system may further comprise a bypass piping connected to the exhaust heat recovery piping and extending through a heat storage tank, the bypass piping including a selector valve for opening and closing the bypass piping.

According to this cogeneration system, a surplus amount of exhaust heat from the private power generating equipment is supplied to the heat storage tank in the daytime, for example, when the heating load is small for the amount of power generated. This can cope with an increase in the heating load over the exhaust heat provided by the private power generating equipment occurring in the evening to nighttime and on the following morning.

Thus, surplus heat is stored in the heat storage tank to cope with an increase in the heating load over the exhaust heat provided by the private power generating equipment occurring in the evening to nighttime and on the following morning. The heat stored in the heat storage tank is available to cover a shortage of heat when the heating load exceeds the exhaust heat from the private power generating equipment.

To fulfill the forgoing objects of the present invention, the above cogeneration system may further comprise a water storage tank connected to the natural circulation piping.

According to this cogeneration system, the heat medium may flow in natural circulation to the water storage tank also, to utilize the exhaust heat of the private power generating equipment to obtain hot water for use.

Thus, the exhaust heat of the private power generating equipment is effectively used to supply the heat medium in natural circulation to the water storage tank for making hot water available for use.

In a further aspect of the present invention, there is provided a cogeneration system comprising private power generating equipment for generating power to be supplied to private electricity consuming equipment; a source-side heat exchanger connected to the private power generating equipment to act as a heat source; an absorption refrigerator disposed above the source-side heat exchanger, the absorption refrigerator being connected to the source-side heat exchanger through a natural circulation piping having, in natural circulation therethrough, a heat medium subjected to gas-liquid phase changes; room cooling heat exchangers arranged below the absorption refrigerator to act as user equipment, the room cooling heat exchangers being connected to an evaporator of the absorption refrigerator through a room cooling natural circulation piping having, in natural circulation therethrough, a heat medium subjected to gas-liquid phase changes; a radiator connected to the natural circulation piping; surplus heat detecting means for detecting presence of surplus heat and outputting a radiation signal; and radiation control means operable in response to the radiation signal to switch the radiator to a radiating state.

According to this cogeneration system of the present invention, the private power generating equipment supplies power to the private electricity consuming equipment, while exhaust heat of the generating equipment is supplied to the source-side heat exchanger. A heat medium is allowed to flow in natural circulation between the source-side heat exchanger and the evaporator of the absorption refrigerator. Further, a different heat medium is allowed to flow in natural circulation between the evaporator and the room cooling heat exchangers. When the exhaust heat from the private power generating equipment exceeds an amount required by the room cooling heat exchangers, the radiation control means automatically switches the radiator to the radiating state to release the surplus heat. In this way, the heat medium is supplied in a controlled amount to the room cooling heat exchangers while the private power generating equipment carries out a predetermined power generating operation.

Thus, the power generated by the private power generating equipment is supplied to the private electricity consuming equipment, with the exhaust heat of the private power generating equipment utilized to heat and evaporate the heat medium. The rooms are cooled by the heat medium flowing in natural circulation between the source-side heat exchanger and the evaporator of the absorption refrigerator and by the heat medium flowing in natural circulation between the evaporator and the room cooling heat exchangers. Consequently, this system dispenses with the heat transmitting drive such as pumps for supplying the heat medium to the room cooling heat exchangers, and simplifies maintenance. The private power generating equipment supplies power to the private electricity consuming equipment, while the exhaust heat of the generating equipment is used to cool the rooms. The entire system is constructed at low cost.

When the exhaust heat from the private power generating equipment exceeds an amount required by the room cooling heat exchangers, the surplus heat is automatically released from the radiator. This control mode is simpler than adjusting delivery from pumps, and contributes toward low cost of the system.

To fulfill the forgoing objects of the present invention, the above cogeneration system may further comprise an ice machine driven by the private power generating equipment, an ice storage tank connected to the ice machine, and a further heat exchanger disposed adjacent the evaporator, the ice storage tank and the further heat exchanger being interconnected through a cooling piping.

This cogeneration system has an economic advantage in being able to cope with an increased cooling load even if the private power generating equipment has a small output capacity.

To fulfill the forgoing objects of the present invention, the above cogeneration system may further comprise room heating heat exchangers connected to the natural circulation piping to act as user equipment.

According to this cogeneration system, the rooms may be heated by the heat medium flowing in natural circulation between the source-side heat exchanger and room heating heat exchangers.

Thus, the cogeneration system has a simple and inexpensive construction to effect room heating as well as room cooling by the exhaust heat from the private power generating equipment.

To fulfill the forgoing objects of the present invention, the above cogeneration system may further comprise an exhaust heat recovery piping interconnecting the private power generating equipment and source-side heat exchanger, and a bypass piping connected to the exhaust heat recovery piping and extending through a heat storage tank, the bypass piping including a selector valve for opening and closing the bypass piping.

According to this cogeneration system, a surplus amount of exhaust heat from the private power generating equipment is supplied to the heat storage tank when the cooling load is small for the amount of power generated. This can cope with an increase in the cooling load occurring in the daytime, for example.

Thus, surplus heat is stored in the heat storage tank to cope with an increase in the cooling load over the exhaust heat provided by the private power generating equipment occurring in the daytime. The heat stored in the heat storage tank is available to cover a shortage of heat when the cooling load exceeds the exhaust heat from the private power generating equipment.

To fulfill the forgoing objects of the present invention, the above cogeneration system may further comprise a water storage tank connected to the natural circulation piping.

According to this cogeneration system, the heat medium may flow in natural circulation to the water storage tank also, to utilize the exhaust heat of the private power generating equipment to obtain hot water for use.

Thus, the exhaust heat of the private power generating equipment is effectively used to supply the heat medium in natural circulation to the water storage tank for making hot water available for use.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DETAILED DESCRIPTION OF THE PREFERRED EMBODIMENTS

Embodiments of the present invention will be described hereinafter with reference to the drawings.

First Embodiment

Figure 1:
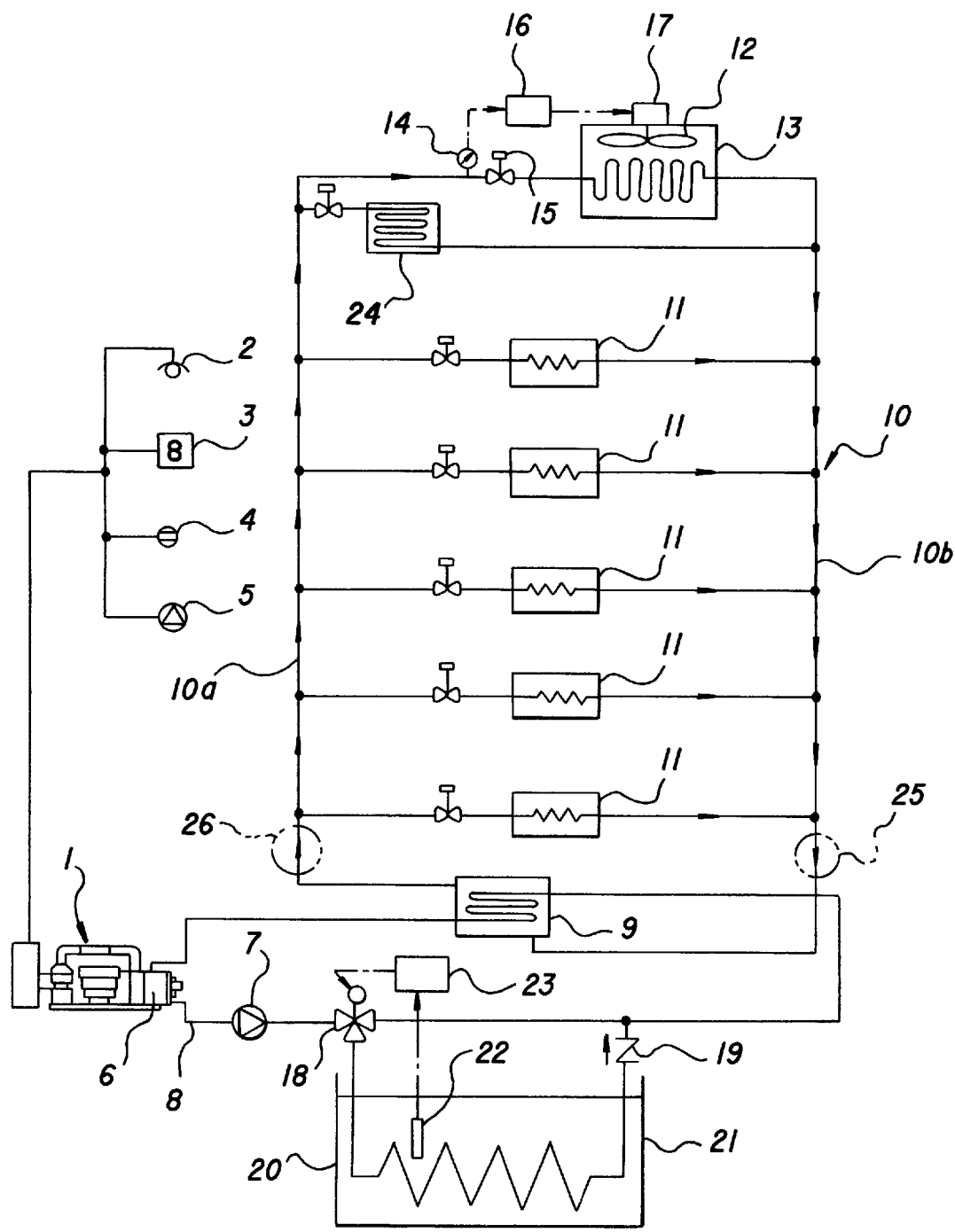
FIG. 1 is a schematic overall view of a cogeneration system in a first embodiment of the present invention.

FIG. 1 is a schematic overall view of a cogeneration system in a first embodiment of the present invention. Numeral 1 denotes a gas engine generator acting as private power generating equipment installed in a basement of a building, for example. The gas engine generator 1 is connected to various private electricity consuming equipment such as lighting equipment 2, ventilating fans 3, plug sockets 4 and feed water pumps 5 installed at different floor levels of the building. Thus, the gas engine generator 1 generates power to be supplied to the private electricity consuming equipment.

The gas engine generator 1 has a cooling jacket 6 to which is connected an exhaust heat recovery piping 8 having a pump 7 mounted in an intermediate position thereof. The exhaust heat recovery piping 8 has a source-side heat exchanger 9 connected thereto to act as a heat source.

The source-side heat exchanger 9 is connected also to a natural circulation piping 10 having, in natural circulation therethrough, a heat medium which is subjected to gas-liquid phase changes. Heat exchangers 11 are connected to the natural circulation piping 10 in positions above the source-side heat exchanger 9 for the purpose of heating the respective floors of the building.

The natural circulation piping 10 is sealed in a fluid-tight condition and is highly resistant to pressure. The natural circulation piping 10 contains water in a decompressed state (at a pressure to evaporate at 75° C., for example) to act as the heat medium. This water turns into steam through a heat exchange in the source-side heat exchanger 9 with hot water (at 90° C. or above, for example) supplied from the cooling jacket 6. The steam flows upward through a steam piping 10a forming part of the natural circulation piping 10, to be supplied to the heat exchangers 11 for the heating purpose. The steam is liquefied through a heat exchange in the heat exchangers 11. The resulting water flows downward through a water piping 10b forming part of the natural circulation piping 10, back to the source-side heat exchanger 9. In this way, the steam and water flow in natural circulation.

A radiator 13 having a radiator fan 12 is connected to the natural circulation piping 10 above an uppermost one of the heat exchangers 11 used for the heating purpose. A pressure sensor 14 and an automatic switch valve 15 are arranged at a steam inlet side of the radiator 13. The pressure sensor 14 acts as surplus heat detecting means for detecting presence of surplus heat and outputting a radiation signal. The automatic switch valve 15 opens under a pressure exceeding a predetermined value. A first microcomputer 16 is connected to the pressure sensor 14 to act as radiation control means. A fan motor 17 is connected to the first microcomputer 16 to drive the radiator fan 12.

In response to the radiation signal from the pressure sensor 14, the first microcomputer 16 outputs an activation signal to the fan motor 17. Then, the fan motor 17 drives the radiator fan 12 to switch the radiator 13 to a radiating state. Thus, surplus heat is automatically released when the exhaust heat exceeds a required amount such as a heating load.

A bypass piping 20 is connected to the exhaust heat recovery piping 8 through a distributing valve 18 acting as a selector valve and through a check valve 19. The bypass piping 20 extends through a heat storage tank 21 to supply part of the hot water from the cooling jacket 6. Consequently, the heat energy of the hot water is stored in the heat storage tank 21.

A temperature sensor 22 is disposed in the heat storage tank 21, and a second microcomputer 23 is connected to the temperature sensor 22. The distributing valve 18 is connected to the second microcomputer 23. Heat accumulation is stopped when water in the heat storage tank 21 reaches a predetermined high temperature (e.g. 85° C.), and is started when the water falls to a predetermined low temperature (e.g. 80° C.).

A water storage tank 24 is connected to the natural circulation piping 10 below the radiator 13. This provision allows the exhaust heat of the gas engine generator 1 to be used to supply hot water.

Second Embodiment

Figure 2:
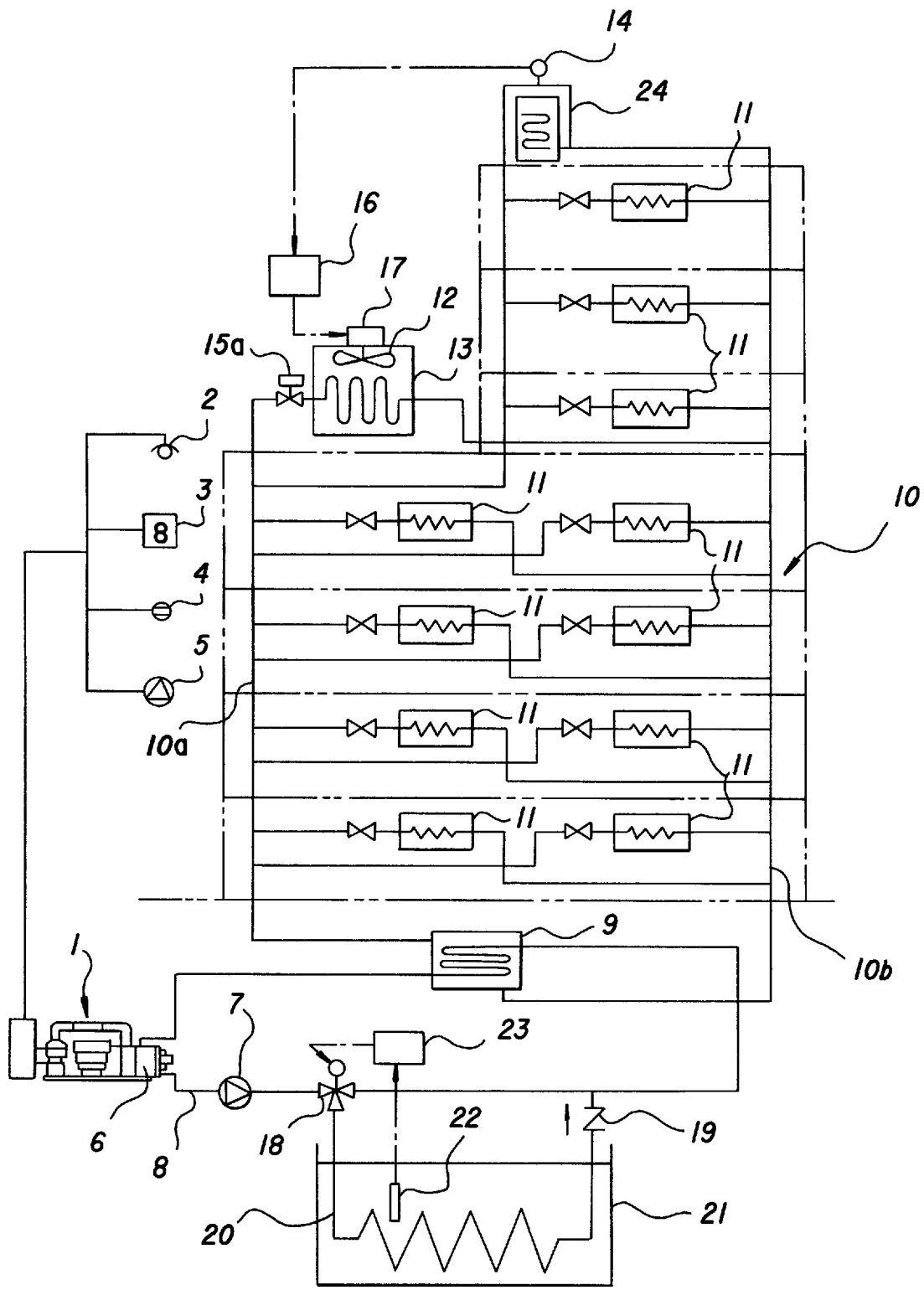
FIG. 2 is a schematic overall view of a cogeneration system in a second embodiment of the present invention.

FIG. 2 is a schematic overall view of a cogeneration system in a second embodiment. This embodiment differs from the first embodiment in the following respects.

The second embodiment is applicable to a building with a portion thereof rising above other portions. This cogeneration system includes a natural circulation piping 10 extending to the high-rise portion, and heat exchangers 11 are connected to the natural circulation piping 10 for a room heating purpose. A water storage tank 24 is mounted on the roof of the high-rise portion and connected to the natural circulation piping 10.

The natural circulation piping 10 extends above the water storage tank 24, where a pressure sensor 14 is connected to act as surplus heat detecting means for detecting presence of surplus heat and outputting a radiation signal.

A radiator 13 is mounted on the roof of a lower portion of the building. A switch valve 15a is disposed at a steam inlet side of the radiator 13. As in the first embodiment, a first microcomputer 16 is connected to the pressure sensor 14, and a fan motor 17 is connected to the first microcomputer 16 to drive a radiator fan 12. Surplus heat is automatically released by opening the switch valve 15a when the exhaust heat exceeds a required amount such as a heating load. The other structural details and functions are the same as in the first embodiment, and like reference numerals are used to identify like parts which will not be described again.

In the above embodiments, the pressure at the steam inlet side is detected to determine presence of surplus heat for switching the radiator 13 to the radiating state. This feature may be modified to detect the temperature instead of the pressure.

In the above embodiments, an auxiliary power generation may be carried out with a water turbine 25 disposed in a lower position of the water piping 10b as shown in a two-dot-and-dash line, or a steam turbine generator 26 disposed in a lower position of the steam piping 10a as shown in a two-dot-and-dash line. The power thus generated may be used in place of the power generated by the gas engine generator 1 to drive the pump 7, for example.

Third Embodiment

Figure 3:
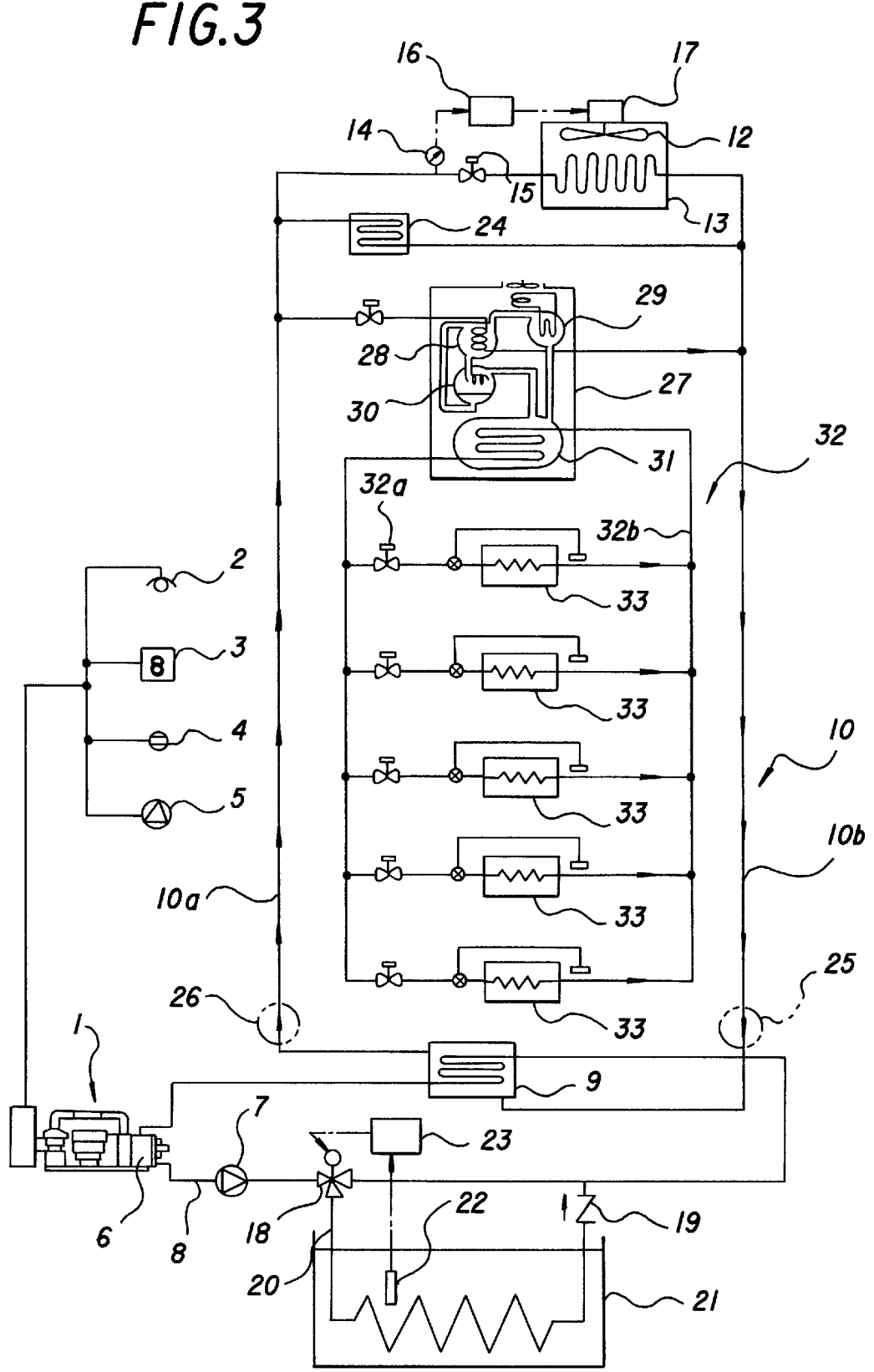
FIG. 3 is a schematic overall view of a cogeneration system in a third embodiment of the present invention.

FIG. 3 is a schematic overall view of a cogeneration system in a third embodiment. This embodiment differs from the first embodiment in the following respects.

The third embodiment includes an absorption refrigerator 27 having a regenerator 28 connected to the natural circulation piping 10. In FIG. 3, numeral 29 denotes a condenser, and numeral 30 denotes an absorber.

A room cooling natural circulation piping 32 is connected to an evaporator 31 of the absorption refrigerator 27. A heat medium subjected to gas-liquid phase changes flows in natural circulation through the room cooling natural circulation piping 32. Heat exchangers 33 are connected to the natural circulation piping 32 in positions below the absorption refrigerator 27 for the purpose of cooling the respective floors of a building.

The natural circulation piping 10 is sealed in a fluid-tight condition and is highly resistant to pressure. The natural circulation piping 10 contains water in a decompressed state (under a pressure to evaporate at 75° C., for example) to act as a heat medium. This water turns into steam through a heat exchange in the source-side heat exchanger 9 with hot water (at 90° C. or above, for example) supplied from the cooling jacket 6. The steam flows upward through a steam piping 10a forming part of the natural circulation piping 10, to be supplied to the regenerator 28 of the absorption refrigerator 27. The steam is liquefied through a heat exchange in the regenerator 28. The resulting water flows downward through a water piping 10b forming part of the natural circulation piping 10, back to the source-side heat exchanger 9. In this way, the steam and water flow in natural circulation.

The room cooling natural circulation piping 32 contains chlorine-free, harmless fluorocarbon R134a to act as a heat medium subjected to gas-liquid phase changes. This fluorocarbon is condensed and liquefied in the evaporator 31 of the absorption refrigerator 27. The fluorocarbon liquid flows down a liquid piping 32a forming part of the room cooling natural circulation piping 32, to be supplied to the heat exchangers 33 for the cooling purpose. This liquid is evaporated through a heat exchange in the heat exchangers 33. The resulting fluorocarbon gas flows upward through a gas piping 32b forming part of the room cooling natural circulation piping 32 to return to the evaporator 31. In this way, the fluorocarbon flows in natural circulation.

A radiator 13 having a radiator fan 12, as in the first embodiment, is connected to the natural circulation piping 10 above the absorption refrigerator 27. A pressure sensor 14 and an automatic switch valve 15 are arranged at a steam inlet side of the radiator 13. The pressure sensor 14 acts as surplus heat detecting means for detecting presence of surplus heat and outputting a radiation signal. The automatic switch valve 15 opens under a pressure exceeding a predetermined value. A first microcomputer 16 is connected to the pressure sensor 14 to act as radiation control means. A fan motor 17 is connected to the first microcomputer 16 to drive the radiator fan 12.

In response to the radiation signal from the pressure sensor 14, the first microcomputer 16 outputs an activation signal to the fan motor 17. Then, the fan motor 17 drives the radiator fan 12 to switch the radiator 13 to a radiating state. Thus, surplus heat is automatically released when the exhaust heat exceeds a required amount such as a cooling load. The other structural details and functions are the same as in the first embodiment, and like reference numerals are used to identify like parts which will not be described again.

Fourth Embodiment

Figure 4:
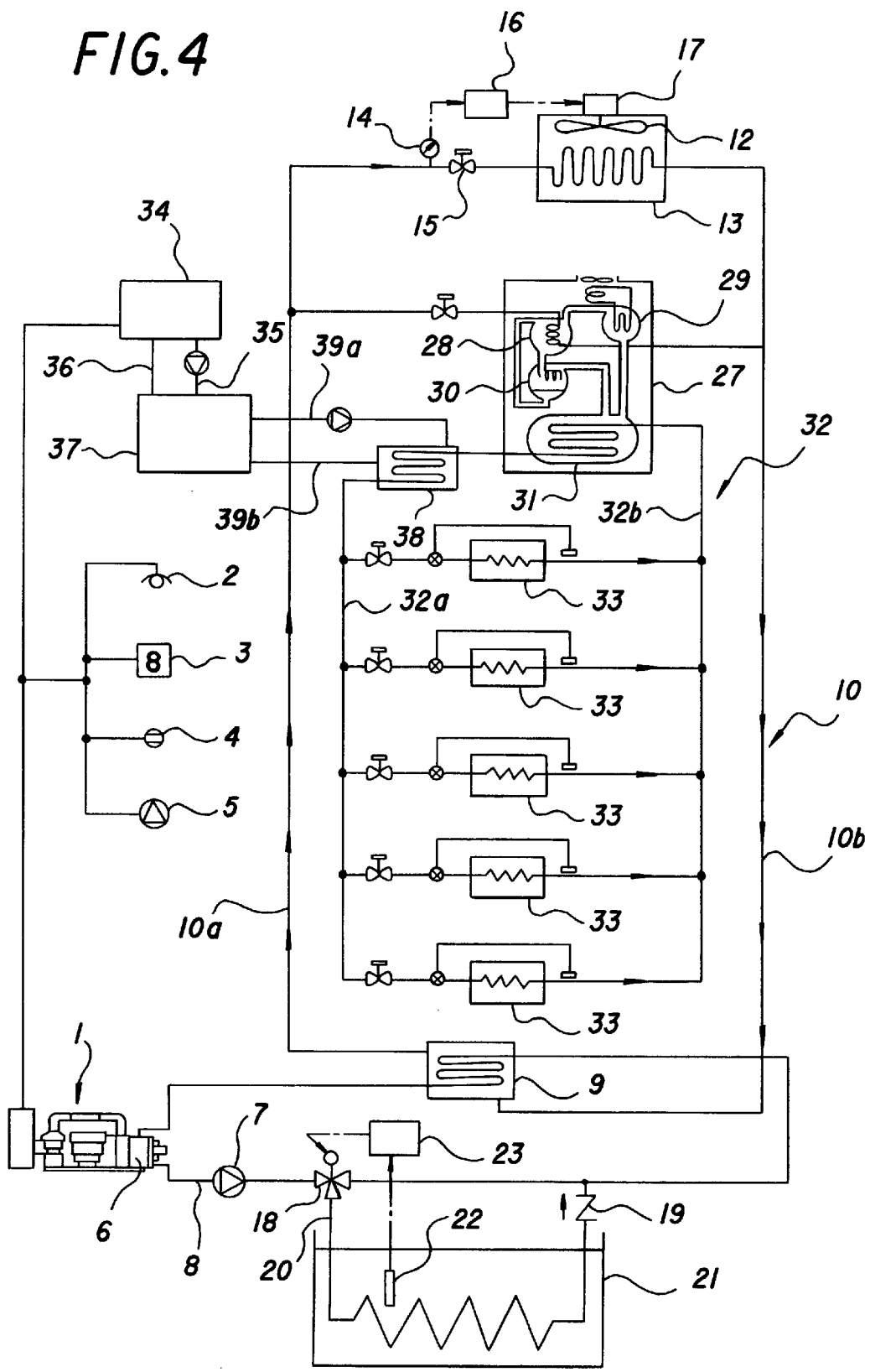
FIG. 4 is a schematic overall view of a cogeneration system in a fourth embodiment of the present invention.

FIG. 4 is a schematic overall view of a cogeneration system in a fourth embodiment. This embodiment differs from the third embodiment in the following respects.

The fourth embodiment includes an ice machine 34 connected to the gas engine generator 1, and an ice storage tank 37 connected to the ice machine 34 through a pump piping 35 and a return piping 36. A heat exchanger 38 is connected to the liquid piping 32a extending from the outlet end of the evaporator 31.

The ice storage tank 37 and heat exchanger 38 are interconnected through cooling piping 39a, 39b. At nighttime when the private electricity consuming equipment consumes little power, for example, the ice machine 34 is driven to make ice which is stored in the ice storage tank 37. The ice is used to promote condensation and liquefaction of the fluorocarbon gas. The other structural details and functions are substantially the same as in the third embodiment, and like reference numerals are used to identify like parts which will not be described again.

Fifth Embodiment

Figure 5:
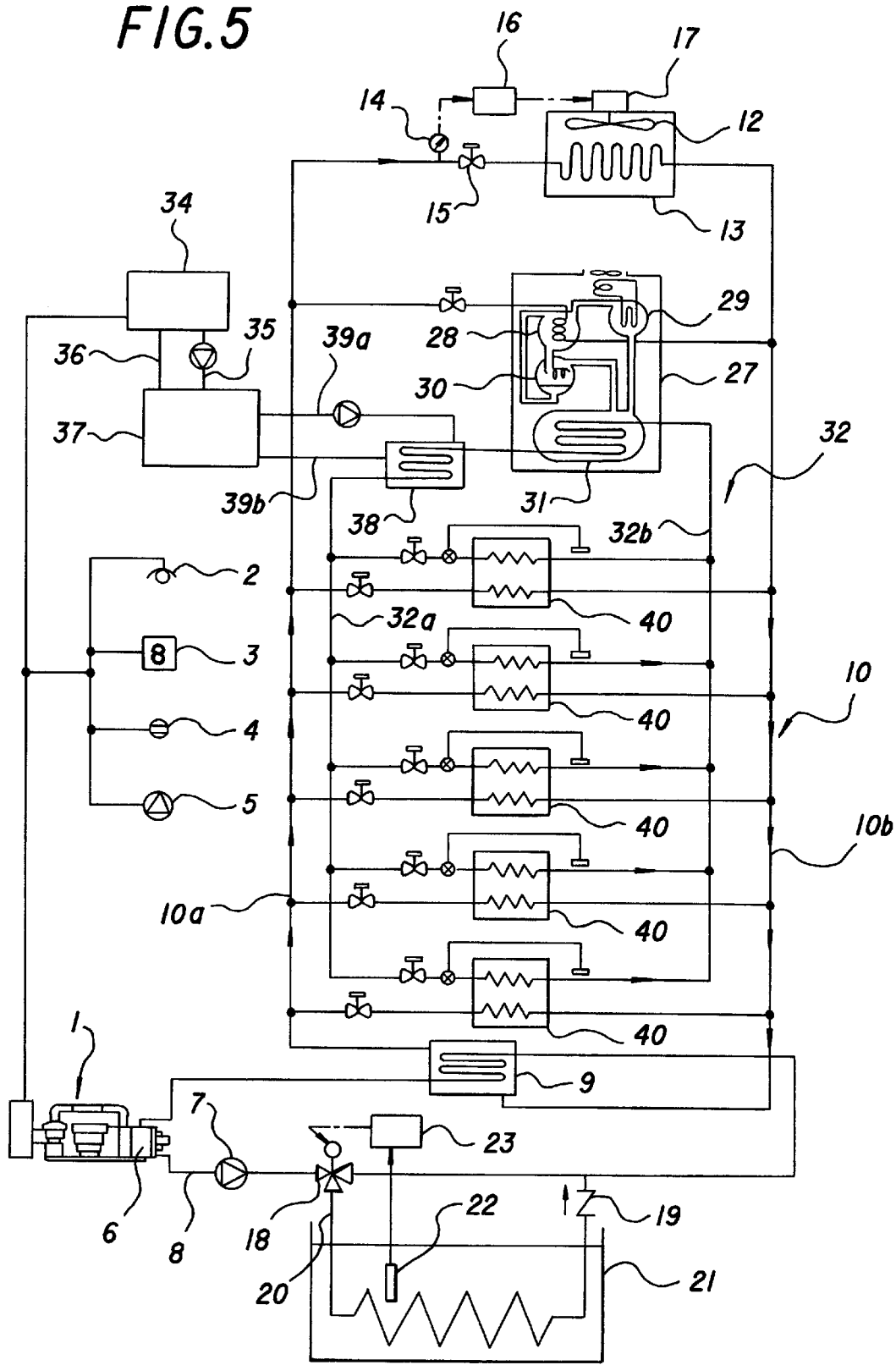
FIG. 5 is a schematic overall view of a cogeneration system in a fifth embodiment of the present invention.

FIG. 5 is a schematic overall view of a cogeneration system in a fifth embodiment. This embodiment differs from the fourth embodiment in the following respects.

The fifth embodiment includes room cooling and heating heat exchangers 40, instead of the room cooling heat exchangers 33, connected to the natural circulation piping 10. The steam generated through the heat exchange in the source-side heat exchanger 9 flows upward through the steam piping 10a to be supplied to the room cooling and heating heat exchangers 40. The steam is liquefied through a heat exchange in the room cooling and heating heat exchangers 40. The resulting water flows downward through the water piping 10b back to the source-side heat exchanger 9. Through this natural circulation, the exhaust heat of the gas engine generator 1 is used also for a heating purpose. The other details are the same as in the fourth embodiment, and like reference numerals are used to identify like parts which will not be described again. The above room cooling and heating heat exchangers 40 may be replaced with heat exchangers used exclusively for the heating purpose and provided along with the room cooling heat exchangers 33.

In implementing each of the described cogeneration systems, the private power generating equipment may be set to an appropriate capacity for supplying the power required in an entire building. It is also possible to install power supply lines from an external source, for coping with great increases in the power load.

Various types of heat exchangers may be employed as the heat exchangers 11 for heating use in the first and second embodiments. Such heat exchangers include the type having fans to blow warm air, and radiator panels for heating by radiation.

The private power generating equipment is not limited to the gas engine generator 1 employed in the described embodiments. The generating equipment may be in the form of a diesel engine generator, a gas turbine generator, or any one of various types of fuel cells such as a phosphatic fuel cell. Any types of generating equipment will serve the purpose of the present invention as long as exhaust heat is produced as a result of power generation.

In the above embodiments, water is enclosed under low pressure in the natural circulation piping 10 to act as the heat medium to flow in natural circulation. A heat medium such as chlorine-free, harmless fluorocarbon R134a or R404A may also be used in the present invention.

The room cooling heat exchangers 33 and room cooling and heating heat exchangers 40 may comprise various types such as the type having fans to blow cool air or warm air, or radiator panels for cooling or heating by radiation.

In the foregoing embodiments, the cooling jacket 6 of the gas engine generator 1 acting as the private power generating equipment is connected to the source-side heat exchanger 9 through the exhaust heat recovery piping 8. Instead of using the exhaust heat recovery piping 8, the source-side heat exchanger 9 may be connected directly to the cooling jacket 6 to receive heat therefrom.

In the fourth and fifth embodiments, the ice storage tank 37 is disposed at the outlet side of the evaporator 31. Instead, the ice storage tank 37 may be disposed parallel to or at the inlet side of the evaporator 31.

The present invention may be embodied in other specific forms without departing from the spirit or essential attributes thereof and, accordingly, reference should be made to the appended claims, rather than to the foregoing specification, as indicating the scope of the invention.

What is claimed is:

1. A cogeneration system comprising:

private power generating equipment for generating power to be supplied to private electricity consuming equipment;

a source-side heat exchanger connected to said private power generating equipment to act as a heat source;

room heating heat exchangers arranged above said source-side heat exchanger to act as user equipment, said room heating heat exchangers being connected to said source-side heat exchanger through a natural circulation piping having, in natural circulation therethrough, a heat medium subjected to gas-liquid phase changes;

a radiator connected to said natural circulation piping;

surplus heat detecting means for detecting presence of surplus heat and outputting a radiation signal; and radiation signal control means operable in response to said radiation signal to switch said radiator to a radiating state;

wherein said source-side heat exchanger is connected to said private power generating equipment through an exhaust heat recovery piping, said cogeneration system further comprising a bypass piping connected to said exhaust heat recovery piping and extending through a heat storage tank, said bypass piping including a selector valve for opening and closing said bypass piping.

2. A cogeneration system as defined in claim 1, further comprising a water storage tank connected to said natural circulation piping.

3. A cogeneration system comprising:

private power generating equipment for generating power to be supplied to private electricity consuming equipment;

a source-side heat exchanger connected to said private power generating equipment to act as a heat source;

user-side heat exchange means arranged above said source-side heat exchanger to act as user equipment, said user side heat exchange means being connected to said source-side heat exchanger through a natural circulation piping having, in natural circulation therethrough, a heat medium subjected to gas-liquid phase changes, said user-side heat exchange means comprising a room heating heat exchanger;

a radiator connected to said natural circulation piping;

surplus heat detecting means for detecting presence of surplus heat and outputting a radiation signal; and radiation signal control means operable in response to said radiation signal to switch said radiator to a radiating state;

wherein said source-side heat exchanger is connected to said private power generating equipment through an exhaust heat recovery piping, said cogeneration system further comprising bypass piping connected to said exhaust heat recovery piping and extending through a heat storage tank, said bypass piping including a selector valve for opening and closing said bypass piping.

4. A cogeneration system as defined in claim 3 further comprising a water storage tank connected to said natural circulation piping.

* * * * *